March 23, 1943.  R. H. HUNTER  2,314,829
PHOTOGRAPHING UNIT
Filed March 12, 1940  3 Sheets-Sheet 1
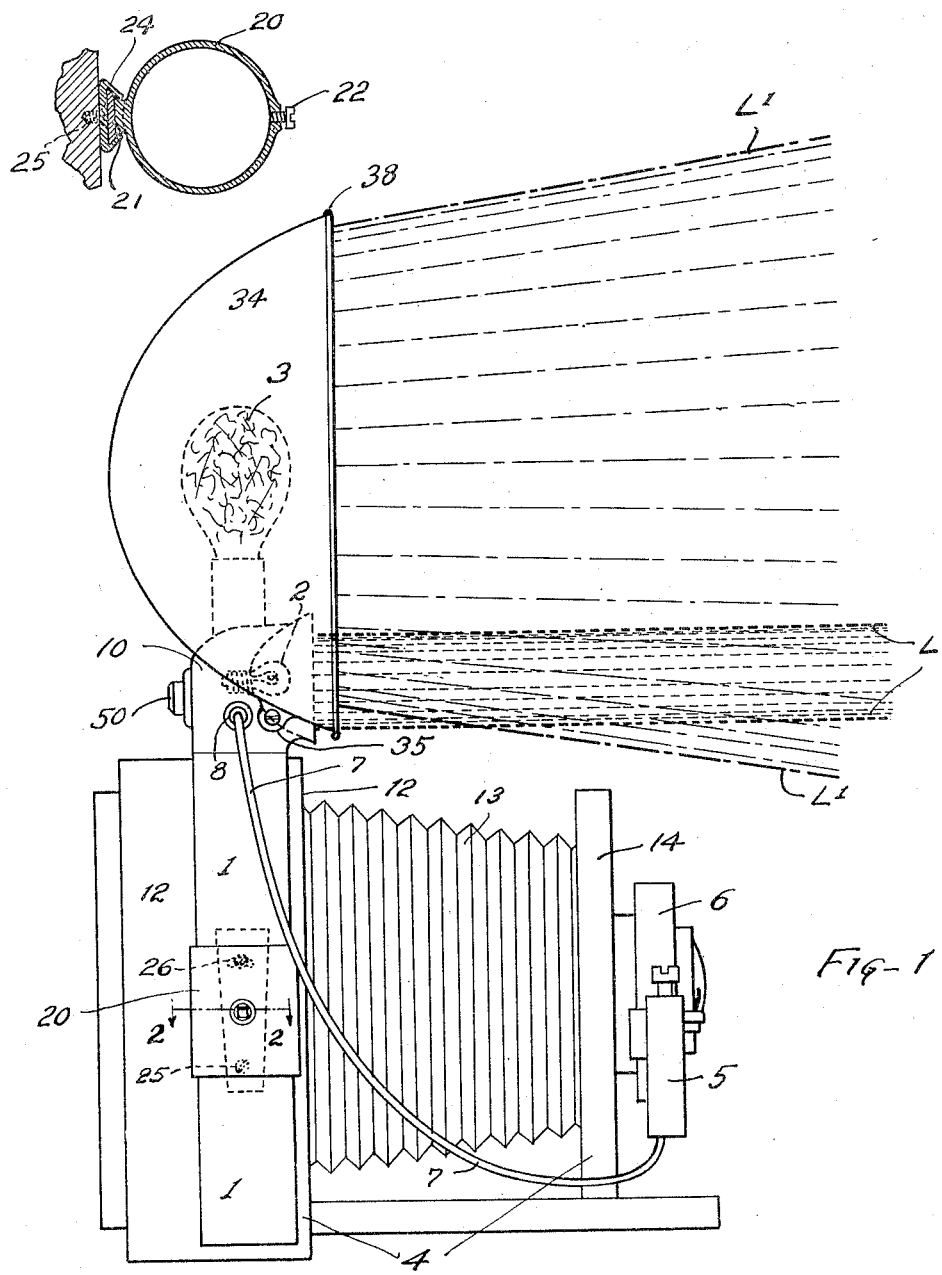
INVENTOR
ROBERT H. HUNTER
BY
ATTORNEY March 23, 1943. R. H. HUNTER 2,314,829
PHOTOGRAPHING UNIT
Filed March 12, 1940 3 Sheets-Sheet 2
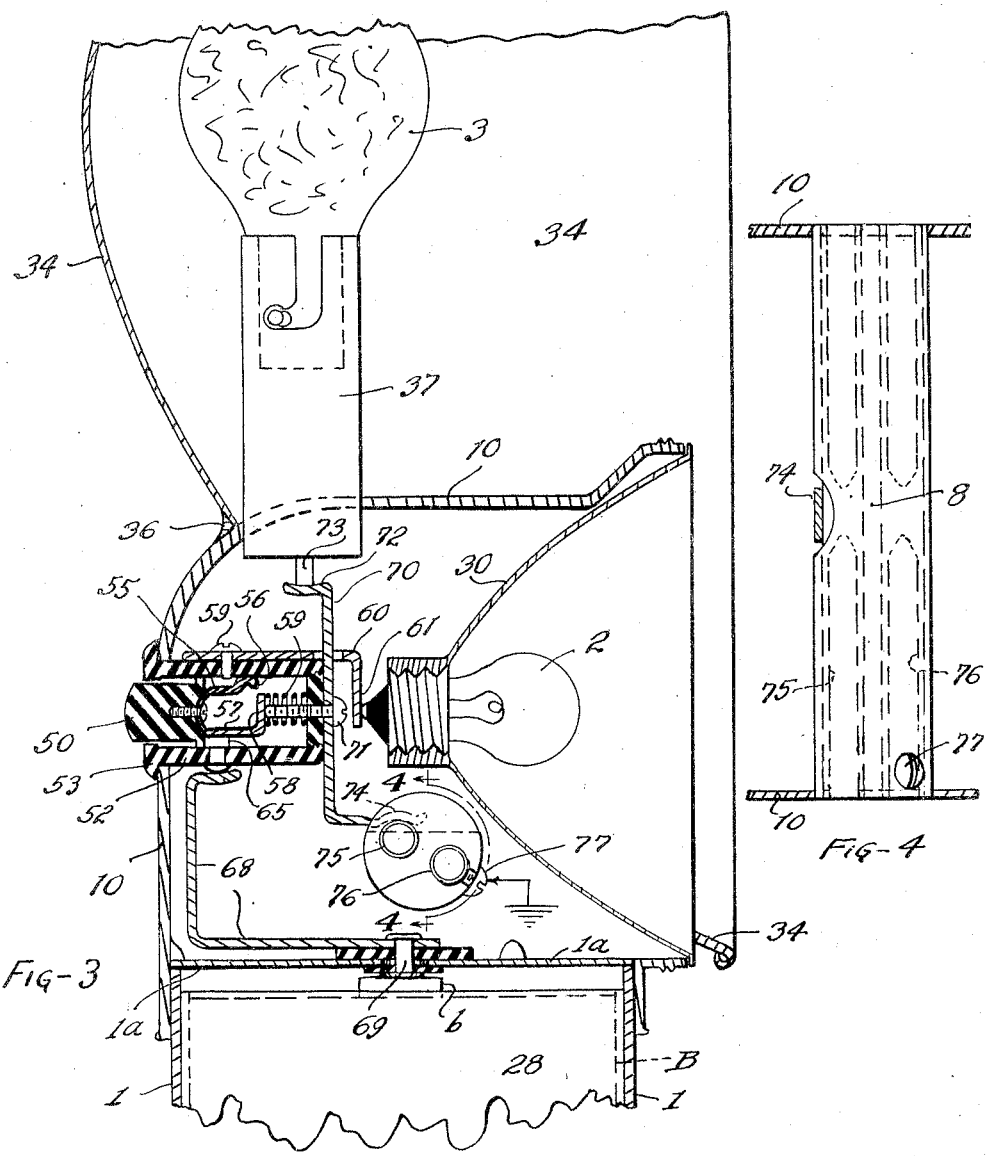
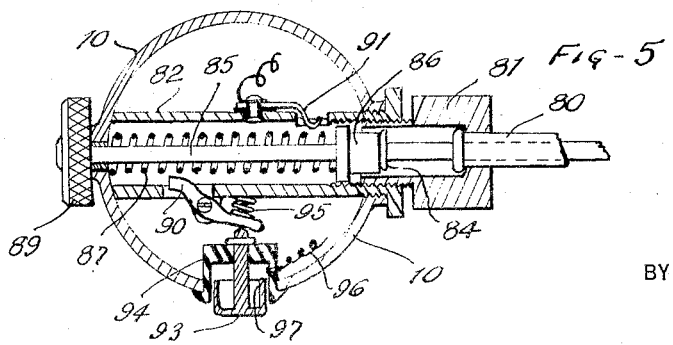
INVENTOR
ROBERT H. HUNTER
BY
George M. Soule
ATTORNEY

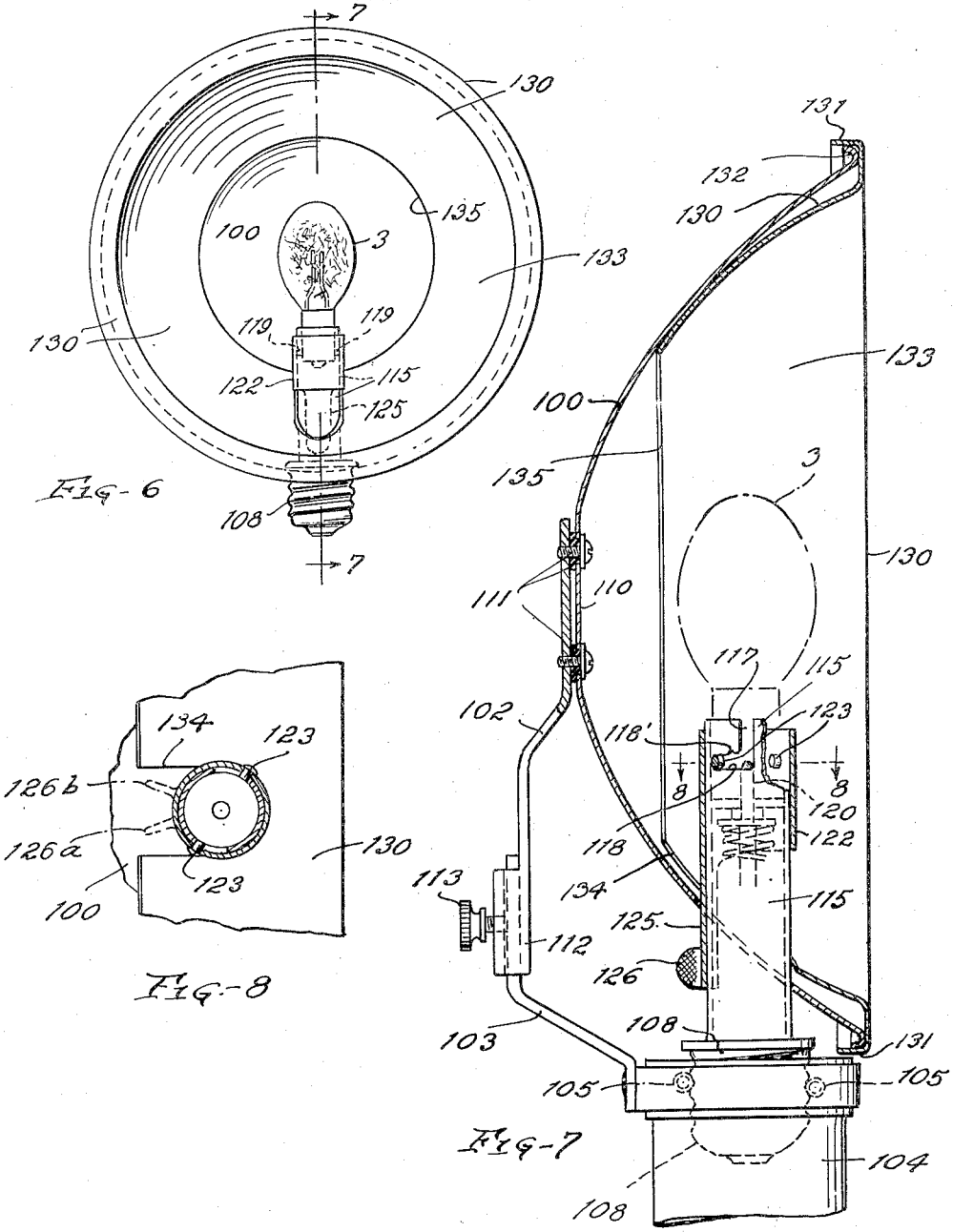

Patented Mar. 23, 1943

2,314,829

UNITED STATES PATENT OFFICE 2,314,829

PHOTOGRAPHING UNIT

Robert H. Hunter, Cleveland, Ohio

Application March 12, 1940, Serial No. 323,591

3 Claims. (Cl. 67—29)

This invention relates to a simple, compact, economical and efficient unit for making photographs at night or under conditions requiring concentrated artificial or "flash" lighting of the subject to be photographed. The above indicates the general object.

Another object is to provide an improved photo-flash bulb support and reflector combination including a reflector capable of concentrating or distributing the light of a small flash bulb for efficient use at a considerable distance, and in which the reflecting surface or surfaces cannot get out of proper position with respect to the bulb.

The invention also comprises an apparatus for enabling concurrent direction of a subject-finding or "pilot" beam of light, a subject-lighting flash illumination device and a camera toward a subject which is to be photographed, said apparatus including means to actuate first, at will, the pilot beam producing means, and second, at will and concurrently, the flash device for illumination of the subject and the camera shutter to make the exposure of the illuminated subject.

A further object is to provide a simple and effective means for operatively aligning the camera lens and mounting means for a photoflash bulb and its reflector and for a pilot or finder bulb and reflector so that the flash bulb light will be concentrated along the axis of the lens and in accordance with the direction of the pilot beam.

A specific object is to provide a common mounting and actuating apparatus for an electric flash-bulb, electric pilot or finder bulb and a camera shutter control mechanism, which apparatus does not require electrical "wiring" connections in the usual sense (screws, solder joints, binding posts, etc.), but in which assembly of the parts into cooperating relationship establishes the necessary electrical connections.

Other objects and features of the invention will become apparent from the following description of the preferred embodiments, shown in the drawings. The drawings show exemplary forms only.

In the drawings, Fig. 1 is a side elevation showing the complete unit, the camera being located beyond and secured to a main upright support for the flash and pilot bulb reflectors; Fig. 2 is a fragmentary sectional view, taken as indicated by the line 2—2 on Fig. 1, showing the camera mounting means of the main support; Fig. 3 is a fragmentary vertical central sectional view of the upper portions of said main support, the view showing various electrical connections, etc.; Fig. 4 is a detail sectional view taken approximately along the line 4—4 on Fig. 3; Fig. 5 is a transverse sectional detail view of the upper portion of the main support, modified in that the camera shutter operating means is partly mechanical instead of being entirely electrical, as in Figs. 1 and 3; Fig. 6 is a view showing a combined bulb and reflector supporting unit constituting a flash gun accessory; Fig. 7 is a relatively enlarged (full size) central vertical cross-sectional view thereof taken substantially along the line 7—7 on Fig. 6, and Fig. 8 is a transverse sectional detailed view taken substantially along the line 8—8 on Fig. 7.

Referring to Fig. 1, the part referred to above as the main upright support is indicated 1. This is preferably a tube and may comprise the hollow handle of a well known type of tandem cell flash light. Dry cells are carried in the tube as at B, Fig. 3, to supply current for energizing the pilot bulb 2, flash bulb 3 and the electromagnetic shutter release mechanism of the camera 4 in the event the camera has this type of shutter release. A housing 5 for the magnet or solenoid of such shutter release is mounted, as usual, beside the shutter case 6. A flexible electric conductor 7 runs from the housing 5 to a plug-in socket 8 mounted in a hood-like head or shell 10 of the main upright support. The part 10 is in the form of a hollow elbow—a metal casting.

The camera 4 has a suitable plate or film case as at 12, to the right of which (Fig. 1) extends the usual bellows 13 and adjustable lens mounting standard 14. The camera may be of any other type.

The cylindrical upright handle 1 enables mounting of the camera for horizontal adjustment, as may be required to point the camera and the light devices at the same object, in a very simple manner. As shown on Fig. 2, a ring 20 of a size adapted snugly to encircle the handle 1, is provided with a base 21 at one side for attachment to the camera frame. A set screw 22 is carried by the ring for frictional engagement with the handle 1 when the ring is properly adjusted with the camera mounted thereon.

It is, of course, desirable to be able to detach the camera from the remainder of the unit. Demountable attachment is enabled, as shown, by providing complementary wedge joint elements on the ring 20 and camera frame. The base 21 of the ring 20 constitutes one of these elements. 24 is the complementary wedge, being fastened to the camera frame by a lower screw 25 and an upper screw 26. If arranged as shown in Figs. 1 and 2 with the female wedge element on the camera frame, then the elements taper downwardly along the handle. The camera is held firmly by at least one hand, thus supporting the remainder of the unit.

To secure vertical adjustment of the camera mounting in initially setting the camera, the screw 25 is first driven into the camera frame in any desired position. The other screw 26 preferably extends through a slot in the base portion of the wedge element 24 so that when the camera lens and the bulb projectors are definitely coordinated in a vertical plane, this relationship may then be maintained by disconnecting the wedge elements and then tightening the screw 26. The degree of taper between the parts 21 and 24 may be much less than as shown, so that, once assembled, it would require considerable force to remove the camera from the support 1.

Referring especially to Fig. 3, the tube 1 contains the dry cells as in flash-light handles, one cell B being shown with the usual paper sleeve 28 surrounding the metal exterior of the cell. Any appropriate joint can be used between the parts 1 and 10, for instance, a bayonet lock, partial threaded connection, or merely a telescoping connection with suitable fastening screw or other holding means as well understood in flashlight construction. In the arrangement shown, a plate 1a is a part of the tube 1 and is riveted or screwed to the shell 10. The shell 10 as shown and the reflector and mounting member 30 thereof for the pilot or finder bulb 2 are standard flash-light parts and very well known. The reflector 30 and its lens (latter not shown) are designed to throw a long narrow beam, the principal portions of which will (assuming a point source of light) be directed as indicated by lines L on Fig. 1, and this is ideal for my purpose as a pilot or finder for objects or areas thereof to be photographed. Cross line or other appropriate marks on the lens may be used to assist in centering if the spot of light thrown by the pilot is found inadequate in special cases.

The reflector 34 is preferably parabolic in shape, of light sheet metal, and can be secured to the shell 10 as by tabs 35 (Fig. 1) struck from the reflector material, or by solder or welding as indicated at 36, Fig. 3. The shell 34 may have a finishing and reinforcing bead 38 spun or formed about its rim.

The parabolic reflector 34 is so positioned relative to the flash bulb as to collect practically all the light emanating from it generally away from the subject and to redirect such light, generally as along the lines L' L' (again assuming a point source of light), approximately in the same direction as the pilot beam and onto the subject in centered surrounding relation to the position of the spot of light thrown by the finder or pilot thereon.

Before the shells 10 and 34 are secured together, a conventional bayonet base bulb socket 37 for the flash bulb 3 is inserted into a hole in the head shell 10 and secured in place as by solder, not shown.

Operative alignment of the two reflectors can be secured in manufacture so that the light thrown by the reflector 34 is approximately parallel to the shaft of light thrown by the finder or pilot light.

The manner in which current from the dry cell batteries is utilized and controlled for effecting the purposes and objects referred to above will now be described.

The switch button 50, Fig. 3, is located conveniently for operation by the thumb of the hand of the operator while the latter is grasping the handle tube 1. As shown, the button 50 has been pressed beyond the position in which it turns on the pilot bulb 2, and into the position in which it causes simultaneous exitation of the shutter operating magnet and explosion of the flash bulb 3. In the illustrated position, the pilot bulb is disconnected from the circuit.

The button 50 slides in a sleeve 52 of insulative material inserted in a hole in the shell 10 and having a shoulder or flange 53 abutting the rear of the shell. The sleeve can be pressed into place or threaded into said hole. Inside the sleeve 52 the button 50 carries a metal strip 55 which, as shown, is in the form of a nearly closed loop having contact arm portions 56, 57 and 58. As soon as the button has been moved inwardly slightly, the arm portion 56 bears against the inner end of a screw or pin 59 on the insulative sleeve 52 and which also holds in position an L-shaped conductor strip 60. The free end portion 61 of the strip 60 is maintained in spring contact with the center feed tip 62 of the pilot bulb. At the same time the arm 57 of the loop-shaped piece rides on an electrically conductive rivet 65 extending through a wall of the insulation sleeve 52. The outer head of the rivet makes contact with a spring arm 68 secured as by an insulating connection, including a center rivet 69, to the top closure 1a of the tube 1. The rivet makes contact with the center pole b of the uppermost dry cell of the series. Since the outer (screw) part of the pilot bulb 2 is grounded to the framework generally, as is the shell of the lower one of the dry cells, in case there are a plurality of dry cells, movement of the button 50 to the slightly depressed position described turns on the pilot or finder light enabling finding of the subject area on which it is desired to center the photograph or enabling the operator to observe the subject and determine exactly when to make the exposure to secure the desired picture. The terminal portion of the arm 56 of the button has to be sprung inwardly slightly in order to pass the contact 59, and this serves as a detent to prevent accidental movement of the button beyond pilot light actuating position.

To feed current to the flash bulb 3 and to the magnetic shutter release, upon movement of the button 50 to the position in which shown, a spring strip 70 is secured as by a screw 71 to an inner end wall member of the insulation sleeve 52, the inner end of which screw serves as a contact point for electrical engagement with the arm 58 of the loop piece 55. A coil spring 59 for holding the button normally in fully "out" position, as against an inner shoulder of the sleeve, may be interposed between the arm 58 and inner end wall of the insulation sleeve. The spring is maintained out of contact with the screw 71 at all times. The arm 70 has one end bent as at 72 for engaging a center contact 73 of the flash bulb socket, thereby to supply battery current to the flash bulb when the arm 58, associated with the switch button, makes contact with the inner end of the screw 71. At the same instant current is supplied to the shutter release magnet by reason of an arm 74 of the strip 70, which arm bears on one of the socket tubes 75 and 76 of the cylindrical receptacle or socket 8, shown more completely in Fig. 4. The contact points of the shutter release conductor 7 (Fig. 1) plug into one end of the socket at the tubes 75 and 76.

Fig. 4 shows the manner in which the insulative body of the receptacle or socket 8 is cut away to expose the socket tube 75 for contact with the arm 74, and also shows how the other tube 76 may be grounded to the shell 10 as by means of a screw 77 (or pin or other member) which extends into the socket or receptacle and bears on the tube 76. The screw 77 can be inserted and set into position before the reflector unit 30 and pilot bulb are mounted in position. The socket 8 can receive plug prongs at either or both ends, enabling the supply of current to operate an additional flash bulb. This is also useful in facilitating connection of the plug of the conductor 7 with the socket when the camera is on the opposite side of the tube 1 from the position in which shown.

It will be observed that as the button 50 is pressed inwardly, contact is broken in the pilot bulb circuit when the high part of the arm 56 moves beyond the inner end of the screw or pin 59. Thus the battery is relieved of having to supply power to the pilot or finder light when exploding the flash bulb and operating the shutter. When the battery becomes sufficiently "low," the unloading by shutting off the pilot becomes essential in order to secure the necessary surge of adequate electrical power.

It is to be understood that the particular type of dry cell housing shown is for illustrative purposes only. It could be of any other type, for instance, with the dry cells side by side. Also, various other details of construction can be greatly modified as occasion may require.

Fig. 5 is to illustrate one manner of arranging the circuit control switch, etc., when the camera has a mechanical cable release for the shutter. In such event, the outer sheath of the cable release (partly shown at 80) is secured adjacent the head shell 10, as at one side of it, by a hollow adjustable sleeve 81 which is threaded (for the adjustment) into the open end of a tube or sleeve 82 fixed within the head. This presents the usual cable release button 84 inwardly beyond the sheath 80 the proper distance for mechanical actuation by appropriate means, in proper timed relation to the explosion of the flash bulb; which is to say approximately simultaneously with the flash. The means shown is more or less diagrammatic.

A plunger 85 with an inner head 86 generally fitting the tube is maintained with the head forced toward the cable release button by a spring 87. An outer head 89, fast on the plunger, serves to enable the operator to withdraw the plunger against its spring pressure to a "cocked" position in which a shoulder on the inner head 86 is engaged and detained by a swingable latch pawl 90 pivoted as on the tube 82. An electrical wiping contact 91 (connected suitably to the flash bulb or its socket) is positioned approximately at the region along the tube where the plunger will, when released, have moved the cable release button in causing the opening of the camera shutter.

The exact position of the button 84 along the tube 82 and which it must occupy at the instant of shutter release can be governed by turning of the threaded sleeve 81, thereby shifting the cable release button in and out by shifting the sheath 80 in and out. The sheath and button continue to bear the same mutual relationship as is well known, and the button being normally urged toward the plunger by spring means (not shown) inside the cable release assembly. Thus I can synchronize the explosion of the flash bulb (done electrically) with the opening of the shutter (done mechanically).

The detent latch for the plunger is released by the switch button 93 which controls also the pilot or finder light bulb. The button 93 can be mounted in a casing 94 secured to the wall of the head shell 10 opposite the sleeve 82 so it is in the same relation to the unit generally as is the button 50 of the previously described form. A return spring for the button is shown at 95.

Initial pressure on the button 93 closes the pilot bulb circuit as though grounding of an electrical lead 96 of said circuit by contact with an inner portion 97 of the button, which latter portion is grounded to the general housing in appropriate fashion. Thus, slight pressure on the button 93 turns on the finder light and the operator can hold this slight pressure with his thumb or finger, or release it as many times as necessary (turning off the pilot), the same as with the previously described construction. But when a predetermined additional pressure is applied to the button 93, then the plunger 85 is released and the concurrent operation of the flash bulb and shutter occur automatically as already described.

As will be seen from the above, the invention enables a person to take well lighted pictures under conditions in which arrangement of conventional or suitable studio or photoflood lighting would be impossible; enables a comparatively small light admission aperture and fast shutter to be used on the camera so that when taking pictures of moving subjects the action will, in photographic parlance, "be stopped"; enables the operator to keep the camera pointed at the subject for selection of the most opportune time, from an artistic standpoint, at which to take the pictures, and enables proper flood lighting and exposure to be effected absolutely simultaneously and at the chosen instant when in the opinion of the operator the action best expresses the desired depiction of the subject.

Referring to the construction shown in Figs. 6 to 8, a parabolic reflector 100 similar to the reflector 34 is shown as equipped with a bracket 102 adapted to cooperate with the conventional reflector supporting bracket 103 of a conventional flash gun unit of which the part 104 constitutes the case for dry cells. Said case can be adapted to support a camera in any suitable manner, for instance, in accordance with the showing hereof Figs. 1 and 2. Such conventional flash guns are usually provided with sockets adapted to receive full size or standard bulbs of the screw-threaded type and one arrangement for securing such bulbs in place comprises a plurality of coil springs such as 105 in the position in the upper part of the case noted in dotted lines on Fig. 7. The screw threaded portion of the plug 108 is simply clasped resiliently by the springs 105 which enter the vally portions of the threads, so that the plug does not have to be turned in placing it in the socket, but can merely be thrust into position where it will be held sufficiently tightly by the springs. Screw plugs such as shown at 108 with upward extensions constituting adapters for bayonet type flash bulbs are already known. I utilize a modification of such known arrangement as to the manner of supporting the bulb. In the usual practice in flash guns the reflector surfaces are not of such character that a focal relationship between them and the bulb is of any significance, and the reflector and bulb mountings are independent of each other. I couple the support for the bulb with the special directional reflector, e. g. parabolic reflector 100, in such a manner that the center of the bulb is always in focus with the reflector surface. Nevertheless the mountings are such that it is easy to appy the unit to the conventional flash gun assembly, and when applied, the desired relationships of parts are definitely maintained.

Referring further to Fig. 7, a bracket member 102 is placed on the back side of the parabolic reflector 100 as at a central flat area 110 thereof, and in order to avoid short circuiting of the usual electric system of the flash gun, the base of the bracket 102 is electrically insulated from the reflector shell as by screw and insulation washer assemblies indicated at 111. The lower end of the bracket 102 is suitably enlarged at 112 and provided with an opening adapted to receive the upstanding end of a bracket 103 on the flash gun tube 104 so that the overlapped portions of the bracket members can be secured rigidly together as by means of a clamping screw 113.

The support for the bulb comprises a tubular body 115 rigid with the plug 108 and extending through the reflector shell 100 and secured rigidly thereto as by solder, welding or otherwise, so that the flash bulb 3 is always in proper focus with respect to the polished parabolic surfaces of the reflector. The attachment for the bulb can be the usual bayonet lock slots including vertical slot portions 117 and horizontal slot portions 118 adapted to receive the oppositely positioned pins 119 (see Fig. 6) of the bulb. As indicated in Fig. 7, the horizontal portions of the slots have locking depressions 118' for the respective pins 119 of the bulb shank. The bulb is pressed upwardly to seat the pins in the depressions by a spring-operated center pin 120 substantially in the usual manner.

The flash bulbs have to be changed rapidly at times in taking successive pictures, and because they get very hot, it is desirable to be able to eject them without touching the bulb with the hands. The arrangement provided for releasing the bulb, so that the pin 120 can eject it, comprises a sleeve 122 on the upper portion of the tube 115 surrounding the same and turnable easily thereon. The sleeve 122 has pins 123 which occupy extensions of the horizontal portions 118 of the bulb-receiving slots beyond the locking depressions 118'. The sleeve has a downward extension 125 passing freely through an adequate opening in the reflector shell 100 and with sufficient clearance at its edges so that the extension can be moved circumferentially of the tube 115 as by a finger piece 126 behind the reflector. When the bulb is placed in its socket, the pins 123 are moved by the pins 119 into retracted position, as shown in Figs. 7 and 8, with reference to the horizontal slot portions 118. To eject the bulb it is only necessary to move the finger piece 127 from the position shown at 126a to the position shown at 126b, Fig. 8, so as to cause the pins 119 to become aligned with the vertical slot portions 117, whereupon the spring operated pin 120 ejects the used bulb.

It is typical of a parabolic reflector such as shown at 100 that it throws all the light emanating from the focal point along parallel paths. The center of the bulb is disposed approximately at such focal point, and when the bulb is exploded the light can be thrown to a considerable distance without much spreading. Since greater spreading is desired when taking pictures at short range, I provide a ring-like shell 130 which fits inside the reflector 100. The shell 130 may have an outer annular flange 131 which closes the gap between the two shells at the rim portions. The flange is turned rearwardly a sufficient distance so that it extends behind the bead portion 132 of the reflector 100 and the bead and flange are held together—but readily removable—as by friction or suitable detents. Forward pressure of the fingers on the rearwardly turned rim portion of the flange is sufficient to remove the shell 130. The shell 130 has an open slot 134 to clear the tube 115 of the bulb support.

The reflecting surface 133 of the ring 130 may be, e. g. spherical or parabolic, but the bulb in any case is not at the focal point. The reflecting surface 133 operates to continue the reflecting surface of the shell 100 which is exposed through the opening 135 of the ring 130 but in such a direction as to receive the rays from the bulb and concentrate them at a short distance from the reflector, thus, in effect, diffusing the light of the bulb reflected by the surface 133 over a larger area beyond the region of concentration. While this reduces the range of illumination in the direction the reflector is pointed, it increases the lateral range. By having the bulb supporting tube 115 and the connecting bracket 102 all in one rigid unit, there is no chance for the reflector to get out of position with respect to the bulb, so that notwithstanding which reflecting surface or surfaces is or are rendered effective, the camera always takes the picture centrally of the illuminated area. With the arrangement shown, the application of the ring-like shell 130 in obstructing relation to the outer reflecting surface portions of the reflector 100 changes the illumination from a 30° total coverage to a 50° coverage.

I claim:

1. In combination, a plurality of reflector units connected together in non-centered relationship but pointed in approximately the same direction, a common mounting for said reflectors capable of carrying dry cells, a camera and means to fix the camera to said mounting, shutter release means for the camera, a photo-flash bulb and a finder bulb electrically associated with the dry cells of the mounting, and means to render the flash bulb operative after the finder bulb is lighted, there being means operatively connecting the shutter release and flash bulb operating means so that the two are operated concurrently.

2. In combination, a hollow flash-light handle constituting a holder for dry cells, an elbow at one end of the holder and having a laterally directed flash light reflector and bulb mounting thereon, a reflector in generally surrounding eccentric parallel relation to the aforesaid reflector and secured to the elbow, and a socket adapted to receive a photo-flash bulb, said socket being carried by the elbow, means electrically connecting the bulb mounting and socket to the dry cells, said means including a switch arranged to be operated by a hand while grasping the handle, said switch upon initial movement energizing only the flash light bulb and later exploding the photo-flash bulb.

3. In a combination comprising a camera having a magnetic shutter release means rigid with the camera and supporting a reflector and socket adapted to receive an explosive flash bulb, a dry cell battery on said means, a finder bulb and reflector on said means parallel to the first mentioned reflector, and means including a switch for rendering the finder bulb effective and subsequently simultaneously supplying battery current to the shutter release means and first mentioned socket.

ROBERT H. HUNTER.